US011927337B1

(12) United States Patent
Tang

(10) Patent No.: US 11,927,337 B1
(45) Date of Patent: Mar. 12, 2024

(54) LIGHTED MIRROR

(71) Applicant: ZHONGSHAN JINGXIAN PHOTOELECTRIC TECHNOLOGY CO., LTD., Zhongshan (CN)

(72) Inventor: Jingchuan Tang, Zhongshan (CN)

(73) Assignee: ZHONGSHAN JINGXIAN PHOTOELECTRIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/466,397

(22) Filed: Sep. 13, 2023

(30) Foreign Application Priority Data

Jul. 19, 2023 (CN) ........................ 202321915583.1

(51) Int. Cl.
*F21V 33/00* (2006.01)
*F21S 4/24* (2016.01)
(Continued)

(52) U.S. Cl.
CPC .............. *F21V 33/004* (2013.01); *F21S 4/24* (2016.01); *F21V 3/049* (2013.01); *F21V 3/061* (2018.02); *F21V 23/008* (2013.01); *F21V 23/0485* (2013.01); *F21W 2131/302* (2013.01); *F21Y 2103/20* (2016.08); *F21Y 2103/33* (2016.08); *F21Y 2115/10* (2016.08)

(58) Field of Classification Search
CPC ........ F21V 33/004; F21V 3/049; F21V 3/061; F21V 23/008; F21V 23/0485; F21S 4/24; F21W 2131/302; F21Y 2103/33; F21Y 2115/10
See application file for complete search history.

(56) References Cited

U.S. PATENT DOCUMENTS 10,823,391 B2 * 11/2020 Thomas ................ F21V 23/003
11,543,118 B1 * 1/2023 Zhan ..................... F21V 33/004
(Continued)

FOREIGN PATENT DOCUMENTS

ES 2387639 * 9/2012 ............ F21V 33/004
KR 102232683 * 3/2021 ................ F21S 4/24

OTHER PUBLICATIONS

KR 10-2232683, Mar. 26, 2021, Gyeong Wol Kim, English Translation (Year: 2021).*
(Continued)

*Primary Examiner* — Peggy A Neils
(74) *Attorney, Agent, or Firm* — Daniel M. Cohn; Howard M. Cohn

(57) ABSTRACT

A lighted mirror relates to a technical field of mirrors and includes a mirror body, a light-transmitting plate defining a first middle hole, a frame body, and an LED light strip structure. The first middle hole is defined on a middle portion of the light-transmitting plate. A rear portion of the mirror body is attached to a front surface of the light-transmitting plate and seals the first middle hole. The frame body is disposed on the rear portion of the mirror body and disposed in the first middle hole. The LED light strip structure is disposed on an outer side face of the frame body and disposed in the first middle hole. A first light-transmitting structure is disposed on the outer side surface of the light-transmitting plate. Second light-transmitting structures disposed around the mirror body are disposed on the front surface of the light-transmitting plate.

17 Claims, 5 Drawing Sheets

(51) Int. Cl.

| | |
|---|---|
| ***F21V 3/04*** | (2018.01) |
| ***F21V 3/06*** | (2018.01) |
| ***F21V 23/00*** | (2015.01) |
| ***F21V 23/04*** | (2006.01) |
| ***F21W 131/302*** | (2006.01) |
| ***F21Y 103/20*** | (2016.01) |
| ***F21Y 103/33*** | (2016.01) |
| ***F21Y 115/10*** | (2016.01) |

(56) References Cited

U.S. PATENT DOCUMENTS

| | | | | |
|---|---|---|---|---|
| 2017/0164719 | A1* | 6/2017 | Wheeler ................ | A45D 42/10 |
| 2019/0003699 | A1* | 1/2019 | Mondora ............... | A45D 42/10 |
| 2021/0361089 | A1* | 11/2021 | Shin .......................... | G06F 3/14 |
| 2022/0010954 | A1* | 1/2022 | Feit .......................... | G02B 5/08 |

OTHER PUBLICATIONS

ES 2387639, Sep. 27, 2012, Schulte et al., English Translation (Year: 2012).*

* cited by examiner

LIGHTED MIRROR

TECHNICAL FIELD

The present disclosure relates to a technical field of mirrors, and in particular to a lighted mirror capable of emitting light from a peripheral side thereof and designing a light-emitting pattern on a front surface thereof.

BACKGROUND

In order to facilitate use of mirrors in a dark environment, or to improve an atmosphere or an aesthetics of the mirrors when used, a light strip acting as a light source is disposed in a conventional mirror. The light emitted by the light strip is transmitted through a light guide ring thereof, which plays a role of illumination. However, by adopting the method of using the light guide ring to guide light, only a circle of light is formed around the conventional mirror, and it is unable to design a pattern of the light, so the conventional mirror has limited aesthetics and cannot reflect brand value.

SUMMARY

A purpose of the present disclosure is to overcome defects in the prior art. The present disclosure provides a lighted mirror capable of emitting light from a peripheral side thereof and designing a light-emitting pattern on a front surface thereof, which solves a technical problem that a shape of a light guide ring of a conventional mirror in the prior art is single and unable to realize a design of a light pattern.

To achieve the above purpose, the present disclosure provides the lighted mirror capable of emitting light from a peripheral side thereof and designing a light-emitting pattern on a front surface thereof. The lighted mirror comprises a mirror body, a light-transmitting plate defining a first middle hole, a frame body, and an LED light strip structure. The first middle hole is defined on a middle portion of the light-transmitting plate. A rear portion of the mirror body is attached to a front surface of the light-transmitting plate and seals the first middle hole. The frame body is disposed on the rear portion of the mirror body and disposed in the first middle hole. The LED light strip structure is disposed on an outer side face of the frame body and disposed in the first middle hole. A first light-transmitting structure is disposed on the outer side surface of the light-transmitting plate. Second light-transmitting structures are disposed on the front surface of the light-transmitting plate. The second light-transmitting structures are disposed around the mirror body. Light emitted by the LED light strip structure is emitted into the light-transmitting plate from an inner side face of the first middle hole and penetrates through the first light-transmitting structure and the second light-transmitting structures. The lighted mirror has a simple structure and is easy to install. By disposing the first light-transmitting structure on the outer side surface of the light-transmitting plate and disposing the second light-transmitting structures of different structures or patterns on the front surface of the light-transmitting plate, when using the lighted mirror, an atmosphere and an aesthetics of the lighted mirror are improved.

In one embodiment, the second light-transmitting structures are frosted structures or fine line structures, which realizes a design of the light-emitting pattern.

In one embodiment, the second light-transmitting structures are pattern structures disposed around the mirror body.

In one embodiment, the first light-transmitting structure is a frosted structure, a fine-grained surface structure, or a sawtooth structure. By such arrangement, when the lighted mirror glows, the light is projected from multiple angles, and the light is soft.

In one embodiment, a slope is disposed on the outer side surface of the light-transmitting plate, and the first light-transmitting structure is disposed on the slope.

In one embodiment, a first loading portion is disposed on a front surface of the frame body. The first loading portion is attached to the rear portion of the mirror body. A first mounting portion is disposed on an outer side of the frame body. The LED light strip structure is mounted on the first mounting portion. Therefore, the LED light strip structure is conveniently mounted.

In one embodiment, an annular protruding portion is disposed on an outer side of the frame body. The annular protruding portion is disposed on one side of the light-transmitting plate. A width of the annular protruding portion is greater than a width of the first middle hole. The annular protruding portion has a light-shielding effect.

In one embodiment, the LED light strip structure emits the light of at least two colors.

In one embodiment, the LED light strip structure is any one of a chip on board (COB) LED light strip, a red-green-blue correlated color temperature (RGBCCT) LED light strip, a red-green-blue-white (RGBW) LED light strip, an RGB LED light strip, and a CCT LED light strip.

In one embodiment, the lighted mirror further comprises a control module disposed on the rear portion of the mirror body. The control module is electrically and signally connected with the LED light strip structure. The control module controls a color and a brightness of the light emitted by the LED light strip structure.

In one embodiment, the lighted mirror further comprises a touch switch disposed on a front surface of the mirror body. The touch switch is electrically and signally connected with the control module. When in use, the lighted mirror is conveniently adjusted and controlled through the touch switch.

In one embodiment, the lighted mirror further comprises an anti-mist device disposed on the rear portion of the mirror body. The anti-mist device is electrically and signally connected with the control module, which prevents mist from generating on the mirror body.

In one embodiment, the lighted mirror further comprises a driving power supply disposed on the rear portion of the mirror body. The driving power supply is electrically connected with the control module, which meets requirements of different scenarios.

In one embodiment, the lighted mirror further comprises a rear plate. A second middle hole is defined on a middle portion of the frame body. An annular loading portion is disposed on one end, away from the mirror body, of the second middle hole. The control module, the driving power supply, and the anti-mist device are disposed on the rear portion of the mirror body and are disposed in the second middle hole. The rear plate is detachably mounted on the annular loading portion. The rear plate is configured to seal the second middle hole.

In one embodiment, the frame body further comprises an annular abutting portion disposed on an outer side of the annular loading portion. A height of the annular abutting portion is matched with a thickness of the rear plate. An outer side surface of the rear plate is attached to an inner side surface of the annular abutting portion.

In one embodiment, a voice recognition module is disposed in the control module.

In one embodiment, the lighted mirror further comprises an application (APP) control module. The APP control module is electrically and signally connected with the control module.

In one embodiment, the lighted mirror further comprises a first hanging rack horizontally disposed on a rear portion of the frame body and/or a second hanging rack vertically disposed on the rear portion of the frame body.

In one embodiment, the frame body is an aluminum metal frame, which is easy to process and produce.

In one embodiment, the light-transmitting plate is a glass plate, an acrylic plate, or a transparent polypropylene (PP) plate.

Compared with the prior art, when in use, the light emitted by the LED light strip structure of the lighted mirror is emitted into the inner side surface of the first middle hole and penetrates through the first light-transmitting structure and the second light-transmitting structure, which realize a beautiful light transmission effect of the lighted mirror on the front surface and the peripheral side of the lighted mirror. In addition, the slope is disposed on the outer side surface of the light-transmitting plate, and the first light-transmitting structure is disposed on the slope, which increases a light-emitting area of the first light-transmitting structure. Moreover, by disposing the first light-transmitting structure of the sawtooth structure on the slope, the light emitted has different emitting angles, is soft, and is rich in appearance.

The second light-transmitting structures of the lighted mirror are pattern structures arrayed around the mirror body. Each of the pattern structures is a rectangular structure, a circular structure, a triangular structure, a ring structure, or other polygonal structures, and each of the pattern structures may also be a LOGO pattern, etc. In the present disclosure, the light is emitted from the front surface and a peripheral side of the lighted mirror, and the light-emitting pattern is disposed on the front surface of the lighted mirror, which improve the atmosphere and aesthetics of the lighted mirror when in sue, and meet the requirements of different scenarios.

The frame body is disposed on the rear portion of the mirror body to facilitate a mounting of the LED light strip structure. Further, the second middle hole is defined on the frame body. The control module, the driving power supply, and the anti-mist device are disposed in the second middle hole, and then the second middle hole is sealed by the rear plate, so that circuit devices are protected. Moreover, the rear plate is detachably mounted, which is convenient for later replacement and maintenance of the circuit devices of the lighted mirror.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
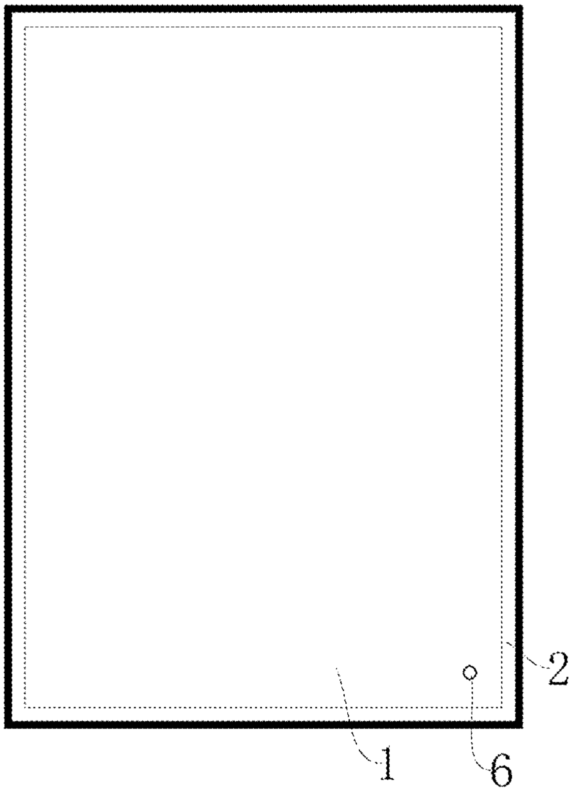
FIG. 1 is a front side elevational schematic diagram of a lighted mirror of the present disclosure.
Figure 2:
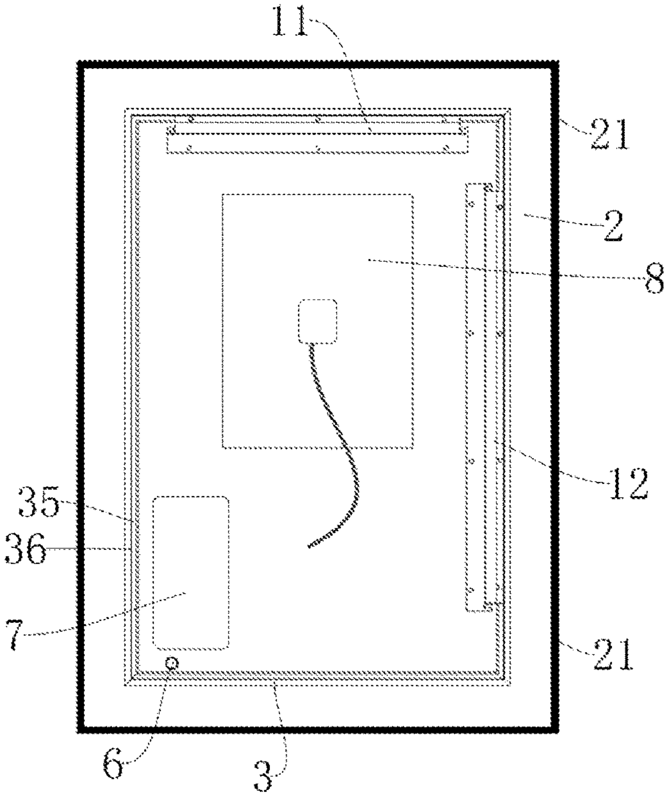
FIG. 2 is a rear side elevational schematic diagram of the lighted mirror of the present disclosure where a rear plate is removed.
Figure 3:
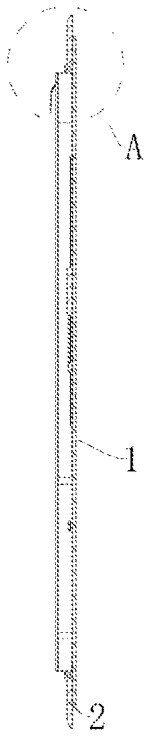
FIG. 3 is a cross-sectional schematic diagram of the lighted mirror of the present disclosure where the rear plate is removed.
Figure 4:
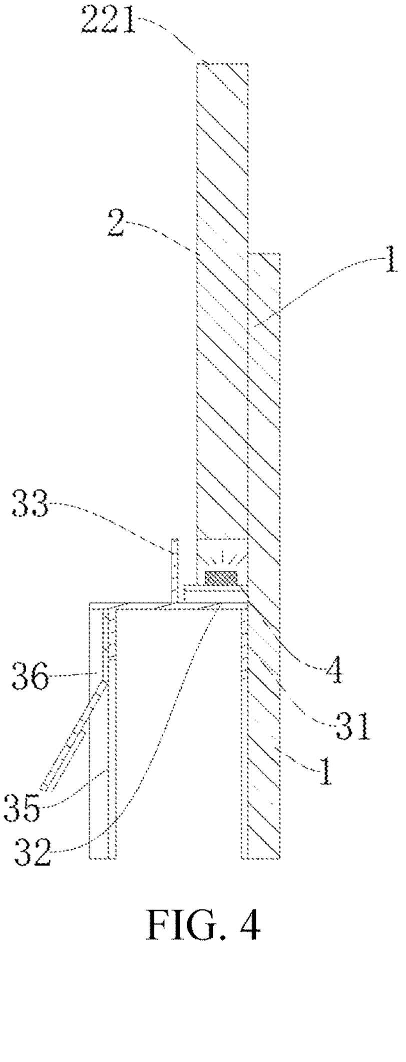
FIG. 4 is an enlarged schematic diagram of portion A shown in FIG. 3 where one side of a light-transmitting plate is flat.

1—mirror body; 2—light-transmitting plate; 21—first middle hole; 22—slope; 221—first light-transmitting structure; 23—second light-transmitting structure; 3—frame body; 31—first loading portion; 32—first mounting portion; 33—annular protruding portion; 34—second middle hole; 35—annular loading portion; 36—annular abutting portion; 4—LED light strip structure; 5—control module; 51—light control module; 52—anti-mist control module; 6—touch switch; 7—driving power supply; 8—anti-mist device; 10—rear plate; 11—first hanging rack; 12—second hanging rack.

DETAILED DESCRIPTION

Technical solutions in the embodiments of the present disclosure will be clearly and completely described below in conjunction with the accompanying drawings in the embodiments of the present disclosure. Obviously, the described embodiments are only a portion of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that all directional indications (such as up, down, left, right, front, back . . . ) in the embodiments of the present disclosure are only used to explain the relationship, relative positional relationship, movement conditions, etc., between the components in a specific posture (as shown in the drawings), if the specific posture changes, the directional indications change accordingly.

It should be noted in the description of the present disclosure that, unless otherwise regulated and defined, terms such as “installation,” “bonded,” and “connection” shall be understood in broad sense, and for example, may refer to fixed connection or detachable connection or integral connection, may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

It should be understood in the embodiments of the present disclosure that terms such as “first” and “second” are only used for the purpose of description, rather than being understood to indicate or imply relative importance or hint the number of indicated technical features. Thus, the feature limited by “first” and “second” can explicitly or impliedly include one or more features. In addition, the term “and/or” depict relationship between associated objects and there are three relationships thereon. For example, A and/or B may indicate A exists alone, A and B exist at the same time, and B exists alone. In addition, the technical solutions between the various embodiments may be combined with each other, but the combination should be realized by those skilled in the art. When the combination of the technical solutions is contradictory or cannot be implemented, it should be considered that the combination of the technical solutions does not exist or is not within the protection scope of the present disclosure.

As shown in FIGS. 1-10, the present disclosure provides a lighted mirror capable of emitting light from a peripheral side thereof and designing a light-emitting pattern on a front surface thereof. The lighted mirror comprises a mirror body 1, a light-transmitting plate 2, a frame body 3, and an LED light strip structure 4.

A first middle hole 21 is defined on a middle portion of the light-transmitting plate 2. A rear portion of the mirror body 1 is attached to a front surface of the light-transmitting plate 2 and seals the first middle hole 21. The frame body 3 is disposed on the rear portion of the mirror body 1 and disposed in the first middle hole 21. The LED light strip structure 4 is disposed on an outer side face of the frame body 3 and disposed in the first middle hole 21.

Figure 5:
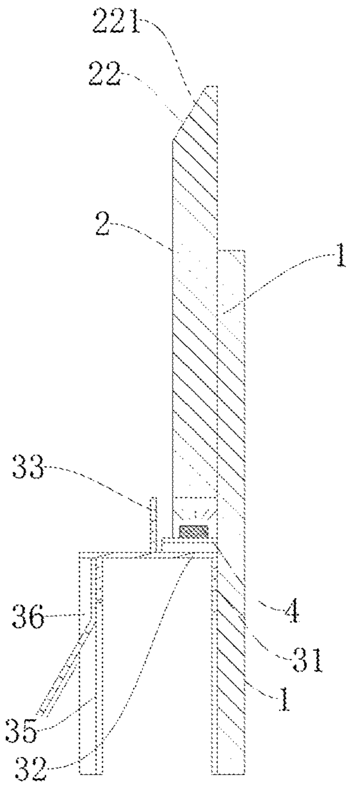
FIG. 5 is an enlarged schematic diagram of portion A shown in FIG. 3 where the one side of the light-transmitting plate is a slope.
Figure 6:
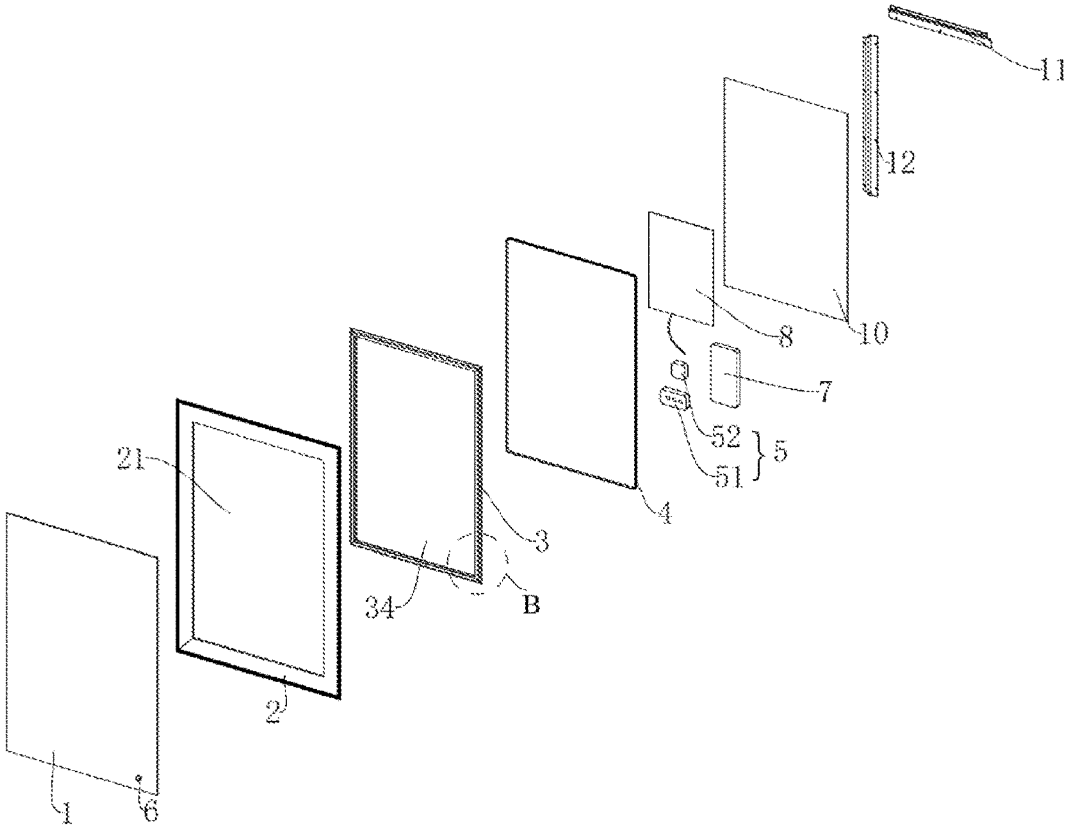
FIG. 6 is an exploded schematic diagram of the lighted mirror of the present disclosure.
Figure 7:
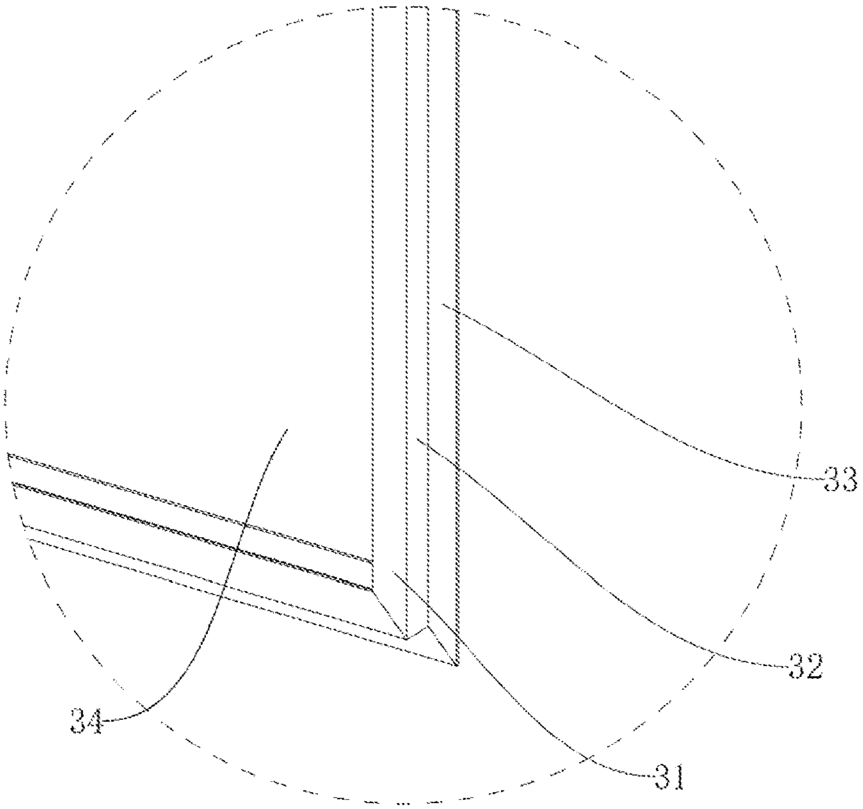
FIG. 7 is an enlarged schematic diagram of portion B shown in FIG. 6.

Optionally, as shown in FIGS. 5-7, a first loading portion 31 is disposed on a front surface of the frame body 3. The first loading portion 31 is attached to the rear portion of the mirror body 1. A first mounting portion 32 is disposed on an outer side of the frame body 3. The LED light strip structure 4 is mounted on the first mounting portion 32. Therefore, the LED light strip structure 4 is conveniently mounted.

The first loading portion 31 is attached to the rear portion of the mirror body 1. After the frame body 3 and the mirror body 1 are assembled, the frame body 3 and the LED light strip structure 4 are disposed in the first middle hole 21. Optionally, an annular protruding portion 33 is disposed on an outer side of the frame body 3. The annular protruding portion 33 is disposed on one side of the light-transmitting plate 2. A width of the annular protruding portion 33 is greater than a width of the first middle hole 21. Therefore, the annular protruding portion 33 shields the light emitted from the LED light strip structure 4. Optionally, the frame body 1 is an aluminum metal frame, which is convenient for production and processing and has a good heat dissipation effect, which improves service life of the LED light strip structure. A first light-transmitting structure 221 is disposed on the outer side surface of the light-transmitting plate 2. The first light-transmitting structure 221 is a frosted structure, a fine-grained surface structure, or a sawtooth structure. Second light-transmitting structures 23 are disposed on the front surface of the light-transmitting plate 2. The second light-transmitting structures 23 are disposed around the mirror body 1. Light emitted by the LED light strip structure 4 is emitted into the light-transmitting plate 2 from an inner side face of the first middle hole 21 and penetrates through the first light-transmitting structure 221 and the second light-transmitting structures 23. The light-transmitting plate 2 is a glass plate, an acrylic plate, or a transparent polypropylene (PP) plate, which is not limited thereto.

When in use, the mirror body 1 of the present disclosure seals the first middle hole 21 on the front surface of the light-transmitting plate 2, so that the light emitted by the LED light strip structure 4 within the first middle hole 21 is blocked by a front surface of the mirror body 1. The light emitted by the LED light strip structure 4 is emitted into the inner side surface of the first middle hole 21 and penetrates through the first light-transmitting structure 221 and the second light-transmitting structures 23, so that a beautiful light-transmitting effect is realized on the front surface and a peripheral side of the lighted mirror.

Optionally, a slope 22 is disposed on the outer side surface of the light-transmitting plate 2, and the first light-transmitting structure 221 is disposed on the slope 22, which increases a light-emitting area of the first light-transmitting structure 221. Moreover, by disposing the first light-transmitting structure of the sawtooth structure on the slope 22, the light emitted has different emitting angles, is soft, and is rich in appearance.

Figure 8:
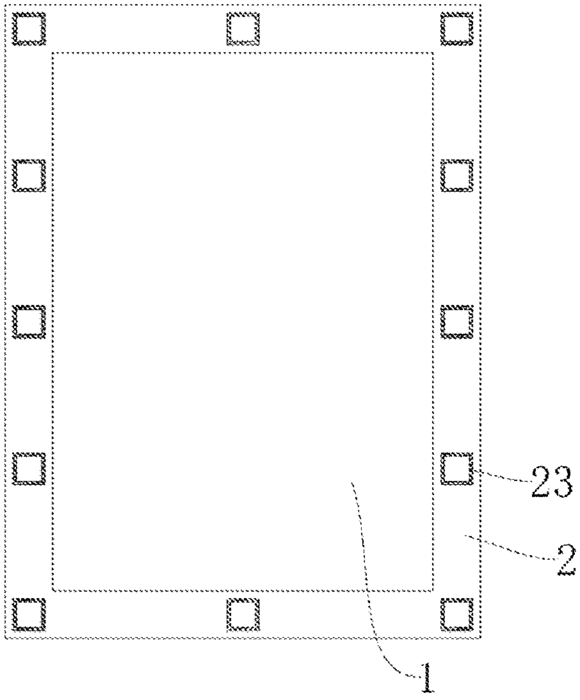
FIG. 8 is a structural schematic diagram of second light-transmitting structures according to a first embodiment of the present disclosure.
Figure 9:
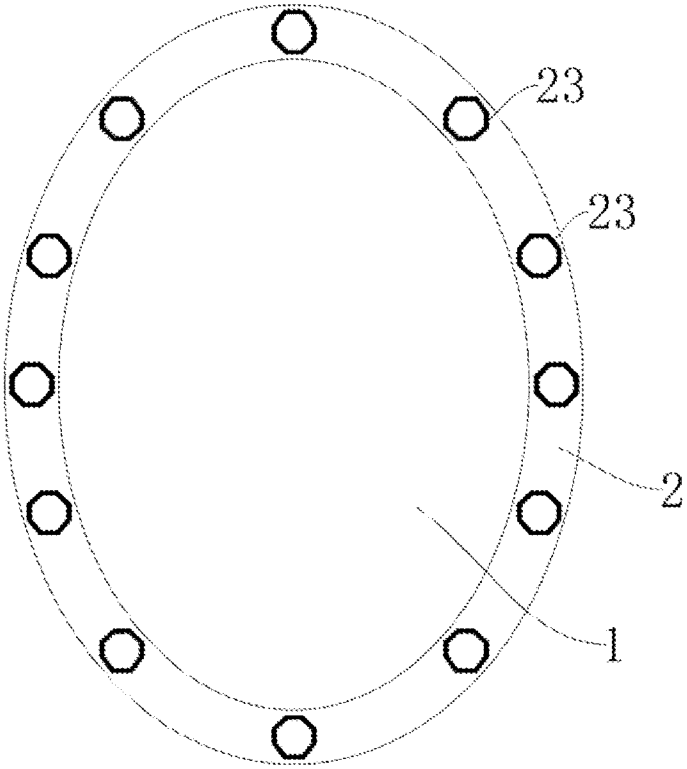
FIG. 9 is a structural schematic diagram of the second light-transmitting structures according to a second embodiment of the present disclosure.
Figure 10:
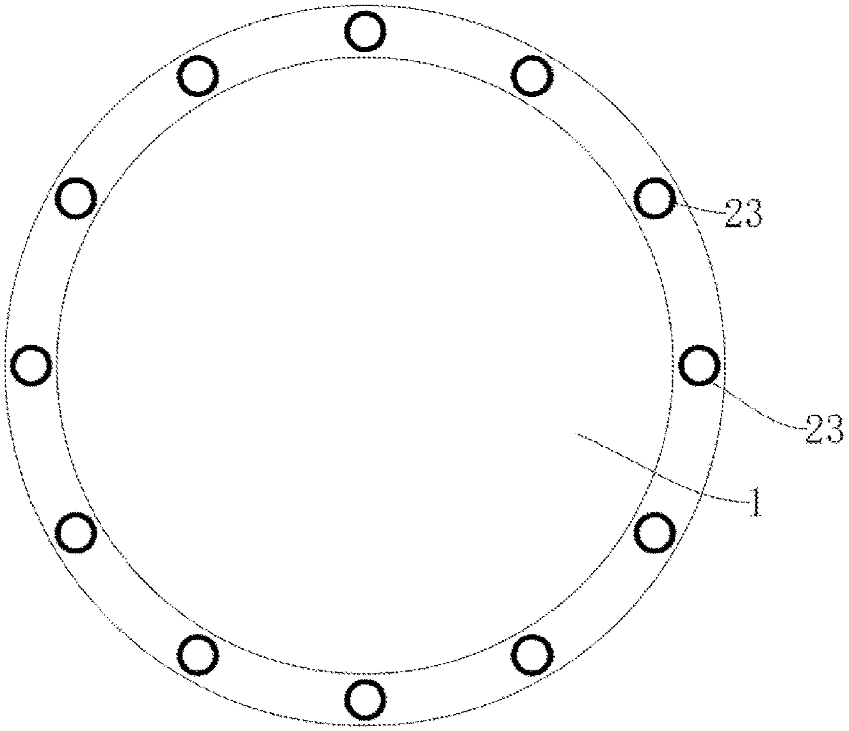
FIG. 10 is a structural schematic diagram of the second light-transmitting structures according to a third embodiment of the present disclosure.

As shown in FIGS. 8-10, the second light-transmitting structures 23 of the lighted mirror are pattern structures arrayed around the mirror body 1. Each of the pattern structures is a rectangular structure, a circular structure, a triangular structure, a ring structure, or other polygonal structures. Alternatively, each of the second light-transmitting structures 23 may be a ring structure with the mirror body 1 as a center and matched with a shape of the mirror body 1, or each of the second light-transmitting structures 23 may also be a LOGO pattern, etc. By disposing the first light-transmitting structure on the outer side surface of the light-transmitting plate and disposing the second light-transmitting structures of different structures or patterns on the front surface of the light-transmitting plate, the light is emitted from the front surface and a peripheral side of the lighted mirror, and the light-emitting pattern is disposed on the front surface of the lighted mirror, which improve the atmosphere and aesthetics of the lighted mirror when in sue, and meet the requirements of different scenarios.

The LED light strip structure 4 emits the light of at least two colors. The LED light strip structure is any one of a chip on board (COB) LED light strip, a red-green-blue correlated color temperature (RGBCCT) LED light strip, a red-green-blue-white (RGBW) LED light strip, an RGB LED light strip, and a CCT LED light strip. According to a product design, different light strips with different functions are selected, enabling the LED lighted strip structure 4 to emit the lights in various colors and different directions.

Optionally, the lighted mirror further comprises a control module 5 disposed on the rear portion of the mirror body 1, a touch switch 6 disposed on the front surface of the mirror body 1, an anti-mist device 8 disposed on the rear portion of the mirror body. The control module 5 is electrically and signally connected with the LED light strip structure 4. The touch switch 6 is electrically and signally connected with the control module 5. The control module 5 comprises a light control module 51 and an anti-mist control module 52. The LED light strip structure 4 is electrically and signally connected with the light control module 51, and the anti-mist device 8 is electrically and signally connected with the anti-mist control module 52. When in use, the touch switch 6 transmits signals to the control module 5. The control module 5 controls a color and a brightness of the light emitted by the LED light strip structure 4 through the light control module 51. The control module 5 controls the anti-mist device 8 to work through the anti-mist control module 52, thereby removing mist on the front surface of the mirror body 1, which is convenient for users to use in different environments and places.

Optionally, a voice recognition module is disposed in the control module 5.

When in use, the voice recognition module receives a voice command of the user and covert the voice command into a signal transmitted to the light control module 51 and the anti-mist control module 52 for operation. The lighted mirror further comprises an application (APP) control module. The APP control module is electrically and signally connected with the control module 5. The APP control module is installed on an external mobile terminal, and the user is able to control the mirror through the APP control module, which improves diversity of functions of the lighted mirror.

Optionally, the lighted mirror further comprises a driving power supply 7 disposed on the rear portion of the mirror body 1. The driving power supply 7 supplies power to the LED light strip structure 4, the control module 5, the anti-mist device 8, and the touch switch 6, so that the lighted mirror is able to be used in a scene where power source is not convenient to connect. Of course, in other embodiments, the lighted mirror may further comprise a plug electrically connected with the control module 5. The plug is electrically connected with outside, so as to supply power to the LED light strip structure 4, the control module 5, the anti-mist device 8, and the touch switch 6.

Optionally, the lighted mirror further comprises a rear plate 10. A second middle hole 34 is defined on a middle portion of the frame body 3. An annular loading portion 35 is disposed on one end, away from the mirror body 1, of the second middle hole 34. The control module 5, the driving power supply 7, and the anti-mist device 8 are disposed on the rear portion of the mirror body 1 and are disposed in the second middle hole 34. The rear plate 10 is fixed on the annular loading portion 35. The rear plate 10 is configured to seal the second middle hole 34. In addition, the frame body 3 further comprises an annular abutting portion 36 disposed on an outer side of the annular loading portion 35. A height of the annular abutting portion 36 is matched with a thickness of the rear plate 10. An outer side surface of the rear plate 10 is attached to an inner side surface of the annular abutting portion 36.

By sealing the second middle hole 34 through the back plate 10, the control module 5, the driving power supply 7, and the anti-mist device 8 are protected from influence of the environment, thus improving service life of the lighted mirror. In addition, the rear plate 10 is detachably connected with the frame body 3. For example, the rear plate 10 is detachably connected with the frame body 3 by screws, bolts or clamping pieces. When the lighted mirror needs to be maintained, the rear plate 10 is detached to replace or repair the control module 5, the driving power supply 7, and the anti-mist device 8.

The lighted mirror further comprises a first hanging rack 11 horizontally disposed on a rear portion of the frame body 3 and/or a second hanging rack 12 vertically disposed on the rear portion of the frame body 1. Specifically, one of the first hanging rack 11 and the second hanging rack 12 may be disposed on the frame body or both of the first hanging rack 11 and the second hanging rack 12 are disposed on the frame body, which is determined by a method that the lighted mirror is hung on a wall, so as to meet different usage situations.

The above embodiments are optional embodiments of the present disclosure, but the embodiments of the present disclosure are not limited by the foregoing embodiments, and any other changes, modifications, substitutions, combinations, and simplification made without departing from the spirit and principle of the present disclosure should be regarded as equivalent replacement manners, which are all included within the protection scope of the present disclosure.

What is claimed is:

1. A lighted mirror, comprising:
- a mirror body,
- a light-transmitting plate defining a first middle hole,
- a frame body, and
- an LED light strip structure;
- wherein the first middle hole is defined on a middle portion of the light-transmitting plate; a rear portion of the mirror body is attached to a front surface of the light-transmitting plate and seals the first middle hole; the frame body is disposed on the rear portion of the mirror body and disposed in the first middle hole; the LED light strip structure is disposed on an outer side face of the frame body and disposed in the first middle hole; a first light-transmitting structure is disposed on the outer side surface of the light-transmitting plate; second light-transmitting structures are disposed on the front surface of the light-transmitting plate; the second light-transmitting structures are disposed around the mirror body; light emitted by the LED light strip structure is emitted into the light-transmitting plate from an inner side face of the first middle hole and penetrates through the first light-transmitting structure and the second light-transmitting structures;
- the lighted mirror further comprises a control module, an anti-mist device, and a driving power supply; the control module, the anti-mist device, and the driving power supply are disposed on the rear portion of the mirror body; the anti-mist device is electrically and signally connected with the control module; the driving power supply is electrically connected with the control module;
- the lighted mirror further comprises a rear plate; a second middle hole is defined on a middle portion of the frame body; an annular loading portion is disposed on one end, away from the mirror body, of the second middle hole; the control module, the driving power supply, and the anti-mist device are disposed on the rear portion of the mirror body and are disposed in the second middle hole; the rear plate is detachably mounted on the annular loading portion; the rear plate is configured to seal the second middle hole.

2. The lighted mirror according to claim 1, wherein the second light-transmitting structures are frosted structures or fine line structures.

3. The lighted mirror according to claim 2, wherein the second light-transmitting structures are pattern structures disposed around the mirror body.

4. The lighted mirror according to claim 1, wherein the first light-transmitting structure is a frosted structure, a fine-grained surface structure, or a sawtooth structure.

5. The lighted mirror according to claim 4, wherein a slope is disposed on the outer side surface of the light-transmitting plate, and the first light-transmitting structure is disposed on the slope.

6. The lighted mirror according to claim 1, wherein a first loading portion is disposed on a front surface of the frame body: the first loading portion is attached to the rear portion of the mirror body; a first mounting portion is disposed on an outer side of the frame body: the LED light strip structure is mounted on the first mounting portion.

7. The lighted mirror according to claim 1, wherein an annular protruding portion is disposed on an outer side of the frame body; the annular protruding portion is disposed on one side of the light-transmitting plate; a width of the annular protruding portion is greater than a width of the first middle hole.

8. The lighted mirror according to claim 1, wherein the LED light strip structure emits the light of at least two colors.

9. The lighted mirror according to claim 8, wherein the LED light strip structure is any one of a chip on board (COB) LED light strip, a red-green-blue correlated color temperature (RGBCCT) LED light strip, a red-green-blue-white (RGBW) LED light strip, an RGB LED light strip, and a CCT LED light strip.

10. The lighted mirror according to claim 8, wherein the control module is electrically and signally connected with the LED light strip structure; the control module controls a color and a brightness of the light emitted by the LED light strip structure.

11. The lighted mirror according to claim 10, wherein the lighted mirror further comprises a touch switch disposed on a front surface of the mirror body; the touch switch is electrically and signally connected with the control module.

12. The lighted mirror according to claim 1, wherein the frame body further comprises an annular abutting portion disposed on an outer side of the annular loading portion; a height of the annular abutting portion is matched with a thickness of the rear plate; an outer side surface of the rear plate is attached to an inner side surface of the annular abutting portion.

13. The lighted mirror according to claim 10, wherein a voice recognition module is disposed in the control module.

14. The lighted mirror according to claim 10, wherein the lighted mirror further comprises an application (APP) control module; the APP control module is electrically and signally connected with the control module.

15. The lighted mirror according to claim 1, wherein the lighted mirror further comprises a first hanging rack horizontally disposed on a rear portion of the frame body and/or a second hanging rack vertically disposed on the rear portion of the frame body.

16. The lighted mirror according to claim 1, wherein the frame body is an aluminum metal frame.

17. The lighted mirror according to claim 1, wherein the light-transmitting plate is a glass plate, an acrylic plate, or a transparent polypropylene (PP) plate.

* * * * *